United States Patent Office.

TALIAFERRO P. SHAFFNER, OF LOUISVILLE, KENTUCKY.

Letters Patent No. 93,753, dated August 17, 1869.

IMPROVED EXPLOSIVE COMPOUND

The Schedule referred to in these Letters Patent and making part of the same.

*To all whom it may concern:*

Be it known that I, TALIAFERRO P. SHAFFNER, of the city of Louisville, county of Jefferson, State of Kentucky, have discovered a new and improved compound, which I call Porifera Nitroleum; and I do declare that the following is a full and exact description thereof.

The nature of my discovery or invention consists in the mixing of nitroleum or nitro-glycerine, with sponge or other vegetable substance that will accomplish the object and purposes herein described.

To enable others skilled in the art to which it belongs, to make and use my invention or discovery, I will now proceed to describe the same.

In blasting with nitro-glycerine, there are more or less difficulties realized, which have to be overcome, and, unless provided for by the manufacturer, less experienced persons have to devise modes or processes to perfect its use, and among those imperfections may be named the excessive weight or concentration of power in a given cubic space, (conditions, in some cases, really indispensable,) while, on the other hand, there are many times when the reverse is necessary or desirable.

Of course gunpowder can be used, but as that explosive is slow, the objects desired might not be realized so effectually as can be by the use of a more rapid explosive, like that of nitro-glycerine.

By preference, I take one pound of well-cleaned sponge and cut it up as fine as possible. The particles or pieces may contain a cubic quantity equal to one hundredth part of an inch or one thousandth, more or less, as may be desired for specific uses.

I mix with this about two pounds of nitro-glycerine.

These proportions will produce an oily-looking powder, somewhat resembling snuff.

The one pound of sponge, however, will easily absorb or hold within its cubic dimensions some four pounds of nitro-glycerine.

I sometimes use other vegetable meterials, such as cotton, cat-tail fibre, sawdust, and other like materials.

To use sawdust and the like vegetable substances, it is desirable to dry them well, and then treat them with a solution of saltpetre, and then dry them well.

This may be done by washing the fibre in the saltpetre-water or by subjecting it to pressure in the said water.

If this be not done on the explosion of the nitro-glycerine, held in the fibre, a smoke will be thrown off highly offensive and injurious, injuring health and retarding the work.

In the use of the sponge, however, this washing need not be done, and further water may be poured into the vessel containing the mixed nitro-glycerine and sponge, and thus prepared, decomposition will be impossible.

Water may be applied to the other species of fibre, but not so effectually.

In the use of these preparations, plaster of Paris, natural, may be mixed with them, which will further lessen the explosive qualities of the nitro-glycerine by concussion or percussion.

These various materials lessen premature explosions, as they are elastic, and prevent a percussive contact sufficient to explode the nitro-glycerine.

Besides the use of free or clear water in the above-described compound, the said water may be impregnated with soda or other alkaline substance.

Having now fully described the nature of my invention or discovery sufficiently full and distinct to enable those skilled in the arts to make and use the same,

What I claim, and desire to secure by Letters Patent, as my invention or discovery, is—

1. A compound, composed of a mixture of nitro-glycerine with sponge or other vegetable fibre, in the manner and substantially as hereinbefore described.

2. The mixing of plaster of Paris or any alkaline substance with the above-named and described compound, substantially in the manner and for the purposes hereinbefore described.

TAL. P. SHAFFNER.

Witnesses.
JAMES DEVEAU,
GEORGE S. HAMLIN.